US006785719B1

(12) United States Patent
Jacobson et al.

(10) Patent No.: US 6,785,719 B1
(45) Date of Patent: Aug. 31, 2004

(54) DISTRIBUTED SYSTEMS FOR PROVIDING SECURED HTTP COMMUNICATIONS OVER THE NETWORK

(75) Inventors: Paul Jacobson, Brookline, MA (US); William Peisel, Framingham, MA (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 10/213,463

(22) Filed: Aug. 6, 2002

(51) Int. Cl.[7] .............................................. G06F 13/00
(52) U.S. Cl. ..................... 709/219; 709/227; 719/313; 713/201
(58) Field of Search ................................ 709/201, 203, 709/217, 219, 227, 228, 237, 246; 719/313, 328; 713/201

(56) References Cited

U.S. PATENT DOCUMENTS

| 6,070,198 A | * | 5/2000 | Krause et al. ............... 709/321 |
| 6,094,485 A | * | 7/2000 | Weinstein et al. ............ 380/30 |
| 6,367,009 B1 | * | 4/2002 | Davis et al. ................ 713/166 |
| 6,606,708 B1 | * | 8/2003 | Devine et al. .............. 713/201 |

* cited by examiner

*Primary Examiner*—Viet D. Vu
(74) *Attorney, Agent, or Firm*—Fish & Richardson P.C.

(57) ABSTRACT

A method of distributing computations is provided. The method includes receiving a secure Hypertext Transfer Protocol request over secured sockets layer, and routing the request to an SSL handler that is distributed on a network of computer systems. Secured sockets layer front end processing is performed on the first server, which then sends SSL big number requests to a second server over a secure channel. The second server performs public key computations using a SSL big number library, and returns the replies to the first server, which completes the SSL processing and routes the request to a web server.

5 Claims, 3 Drawing Sheets

DISTRIBUTED SYSTEMS FOR PROVIDING SECURED HTTP COMMUNICATIONS OVER THE NETWORK

TECHNICAL FIELD

This invention relates to distributed computations.

BACKGROUND

A Web server is a program that, using the client/server model and the World Wide Web's Hypertext Transfer Protocol (HTTP), serves the files that form Web pages to Web users (whose computers contain HTTP clients that forward their requests).

HTTPS (Hypertext Transfer Protocol over Secure Socket Layer, or HTTP over SSL) is a Web protocol developed by Netscape and built into its browser that encrypts and decrypts user page requests as well as the pages that are returned by the Web server. HTTPS is really just the use of Netscape's Secure Socket Layer (SSL) as a sublayer under its regular HTTP application layering SSL requires a huge amount of memory and is CPU-bound. Some low-cost embedded system processors have recorded the most rigorous SSL computations on the order of ten's of seconds, and worst case, several minutes. This performance makes SSL infeasible on some low-cost embedded systems.

SUMMARY

In an aspect, the invention features a method including receiving a secure Hypertext Transfer Protocol request over SSL, and routing the request to an SSL handler that is distributed on a network of computer systems. SSL front end processing is performed on the first server, which then sends SSL big number requests to a second server over a secure channel. The second server performs public key computations using a SSL big number library, and returns the replies to the first server, which completes the SSL processing and routes the request to a web server.

In another aspect, the invention features a network including a user system linked to group of globally connected computer systems, a first server, the first server including an SLL layer for performing SSL front end processing, a second server linked to the first server via a secure communication channel, the second server including an SSL big number library, and a web server residing in the first server.

The painstaking computations required by SSL are due to the public key cryptography requirements, which involve computing modular multiplications and/or exponentiations on numbers exceeding 1000 or more bits. The present invention is the distribution of this problem, such that an embedded system (for instance, the first SSL server) can save memory, and importantly, CPU-cycles. More importantly, transferring these computations to more powerful machines (for instance, the second SSL server containing the big number library) reduces the unacceptable latency due to these computations.

Other features, objects, and advantages of the invention will be apparent from the description and drawings, and from the claims.

DETAILED DESCRIPTION

Figure 1:
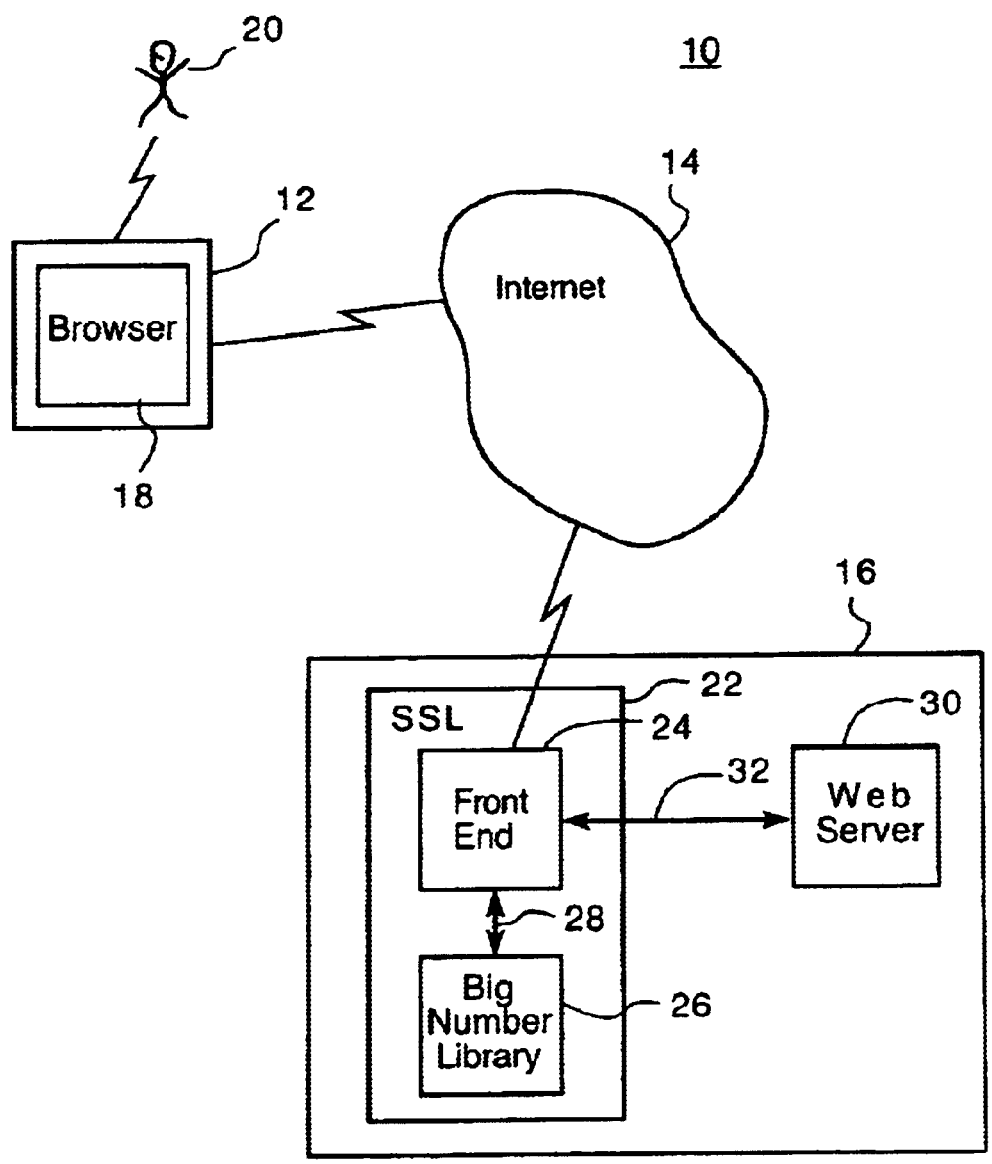
FIG. 1 is a block diagram of a first network.

Referring to FIG. 1, a first network includes a user system 12 linked to the Internet 14. The user system 12 includes browser software 18 such as Netscape Navigator or Microsoft Internet Explorer. Browser software is an application program that provides a way to look at and interact with information contained in servers located throughout the Internet 14, such as server 16. A Web browser is a client program that uses the Hypertext Transfer Protocol (HTTP) to make requests of Web servers, e.g., server system 16 in first network 10, throughout the Internet 14 on behalf of a browser user 20.

The server system 16 is linked to the Internet 14. In an example, secure HTTP requests from the browser 18 to the server 16 are encapsulated over SSL and thus processed by an SSL layer 22 in the server 16. SSL is included as part of both the Microsoft and Netscape browsers and most Web server products.

The server 16 requests are processed by the SSL layer 22. The SSL layer includes an SSL Front End 24 that makes function calls into an SSL big number library 26 via a big number application-programming interface (API) 28. The SSL front end 24 contains the SSL protocol and symmetric cryptography.. The SSL Big Number Library 26 is used for public key computations. The big number API 28 is shown where the SSL Front End 24 makes calls into the Big Number Library 26. After all the SSL is processed and stripped off, web requests are passed to a Web Server 30 through interprocess communication 32.

The bulk of the processing takes place in the Big Number Library 26. When the server 16 is an embedded device with a low-cost processor, the latency (delay) due to the processing required by SSL becomes unacceptable, thus eliminating the possibility of using HTTP over SSL.

Figure 2:
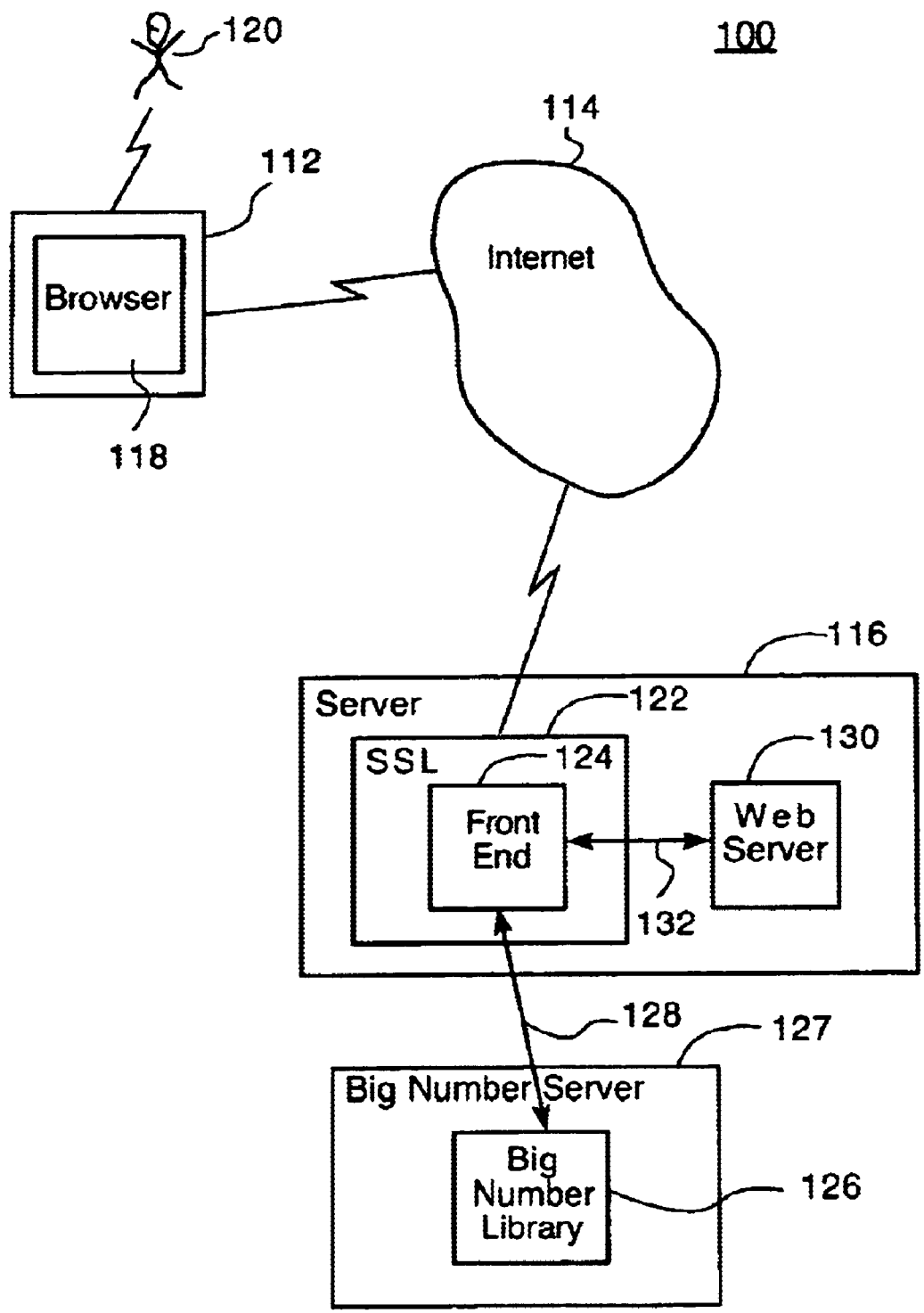
FIG. 2 is a block diagram of a second network.

Referring to FIG. 2, a second network 100 includes a user system 112 linked to the Internet 114. The user system 112 includes browser software 118 such as Netscape Navigator or Microsoft Internet Explorer. The server system 116 is linked to the Internet 114. In an example, secure HTTP requests from the browser 118 to the server 116 are encapsulated over SSL and thus processed by an SSL layer 122 in the server 116.

The SSL layer 122 includes an SSL Front End 124 residing in the server 116. The SSL front end 124 is linked to an SSL big number library 126 residing in a big number server 127 via a secure channel 128 and passes requests to the big number library 126, which processes the request and returns the result back to the SSL front end 124, via the secure channel 128. After all the SSL is processed and stripped off, the SSL front end 124 passes the web requests to a web server 130 through interprocess communication 132.

The second network 100 distributes SSL such that the big number library 126 is resident on a more power machine, i.e., big number server 127. Big number server 127 is sized to accommodate CPU-bound processing with more cache, more memory, and higher performing CPUs.

Figure 3:
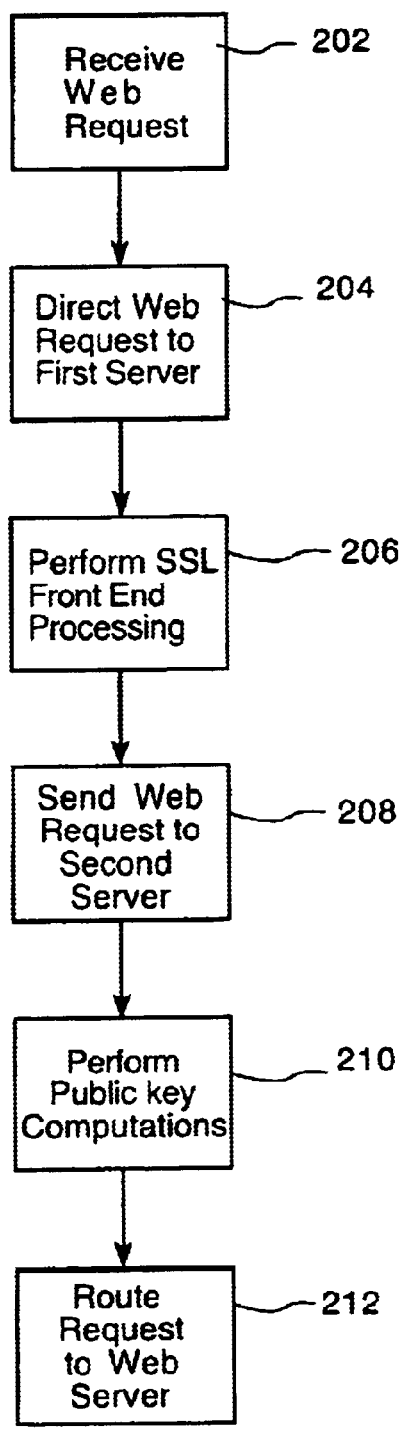
FIG. 3 is a flow diagram.

Referring to FIG. 3, a distributed SSL process 200 includes receiving (202) web request from a user through a browser. The process 200 directs (204) the web request through the Internet to a first server. The process 200 performs (206) SSL front end processing on the web request in the first server. The process 200 sends (208) the big number requests to a big number library located in a second sever. The process 200 performs (210) public key computations in the big number library and returns the big number results back to the front end processing, which completes SSL processing and routes (212) the web request to a web server.

Other embodiments are within the scope of the following claims. For example, the process may be applied to any process executing on a low-cost processor in which one or more sections of the executing process are compute-intensive. The compute-intensive section(s) may be distributed to system having a faster processor. The faster processor performs the compute-intensive operations requested by the low cost processor and returns results to the low cost processor.

What is claimed is:

1. A method comprising;

receiving a secure Hypertext Transfer Protocol (HTTP) request over secured sockets layer (SSL);

routing the request to an SSL handler that is distributed on a network of computer systems to a first server;

performing secured sockets layer (SSL) front end processing on the request in the first server;

sending SSL big number requests to a second server over a secure channel;

performing public key computations using a SSL big number library residing in the second server;

returning replies to the first server for completion of SSL processing; and routing the request to a web server.

2. The method of claim 1 in which the HTTP request is a user request received through a browser.

3. The method of claim 1 in which the network of computer systems is the Internet.

4. The method of claim 1 in which the network of computer systems is an intranet.

5. An article comprising:

a storage medium having stored thereon instructions that when executed by a machine result in the following:

receiving a secure Hypertext Transfer Protocol (HTTP) request over secured sockets layer (SSL);

routing the request to an SSL handler that is distributed on a network of computer systems to a first server;

performing secured sockets layer (SSL) front end processing on the request in the first server;

sending SSL big number requests to a second server over a secure channel;

performing public key computations using a SSL big number library residing in the second server;

returning replies to the first server for completion of SSL processing; and routing the request to a web server.

* * * * *